(12) United States Patent
Wieder et al.

(10) Patent No.: US 8,965,655 B2
(45) Date of Patent: Feb. 24, 2015

(54) METHOD FOR OPERATING A BRAKE-SLIP REGULATING ARRANGEMENT OF A BRAKE SYSTEM OF A VEHICLE

(75) Inventors: Gerhard Wieder, Besigheim (DE); Adnan Mustapha, Maulbronn (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 150 days.

(21) Appl. No.: 13/578,199

(22) PCT Filed: Feb. 19, 2011

(86) PCT No.: PCT/EP2011/051878
§ 371 (c)(1),
(2), (4) Date: Dec. 3, 2012

(87) PCT Pub. No.: WO2011/098475
PCT Pub. Date: Aug. 18, 2011

(65) Prior Publication Data
US 2013/0080014 A1    Mar. 28, 2013

(30) Foreign Application Priority Data
Feb. 10, 2010   (DE) .......................... 10 2010 007 409

(51) Int. Cl.
*B60T 8/1761* (2006.01)
*B60T 8/1766* (2006.01)

(52) U.S. Cl.
CPC ........... *B60T 8/17616* (2013.01); *B60T 8/1766* (2013.01); *B60T 8/1761* (2013.01); *B60T 2210/16* (2013.01)
USPC .......................................................... 701/71

(58) Field of Classification Search
USPC .......................................................... 701/71
See application file for complete search history.

(56) References Cited

U.S. PATENT DOCUMENTS

| 5,253,393 A | 10/1993 | Levin |
| 6,312,066 B1 | 11/2001 | Gronau et al. |

(Continued)

FOREIGN PATENT DOCUMENTS

| CN | 1327423 | 12/2001 |
| DE | 40 30 980 | 4/1992 |

(Continued)

OTHER PUBLICATIONS

International Search Report of PCT/EP2011/051878 dated Feb. 9, 2011.

(Continued)

*Primary Examiner* — John R Olszewski
*Assistant Examiner* — Jason Roberson
(74) *Attorney, Agent, or Firm* — Kenyon & Kenyon LLP

(57) ABSTRACT

A method and device for operating a brake-slip regulating arrangement of a vehicle brake system in various operating modes, in accordance with driving conditions, including: activating, in an on-road operating mode, the arrangement on at least one rear axle and one front axle, even in the off-road operating mode, the arrangement continues to operate on at least one rear axle of the vehicle until the brake slip on at least one wheel of a front axle is less than or equal to a specified brake-slip limit; if the specified brake-slip limit is exceeded by the brake slip on the at least one wheel of the front axle, putting the arrangement out of operation on the rear axle and is not put into operation again until the brake slip on the at least one wheel of the front axle is again less than or equal to the specified brake-slip limit.

23 Claims, 1 Drawing Sheet

(56) References Cited

U.S. PATENT DOCUMENTS

Figure 1:
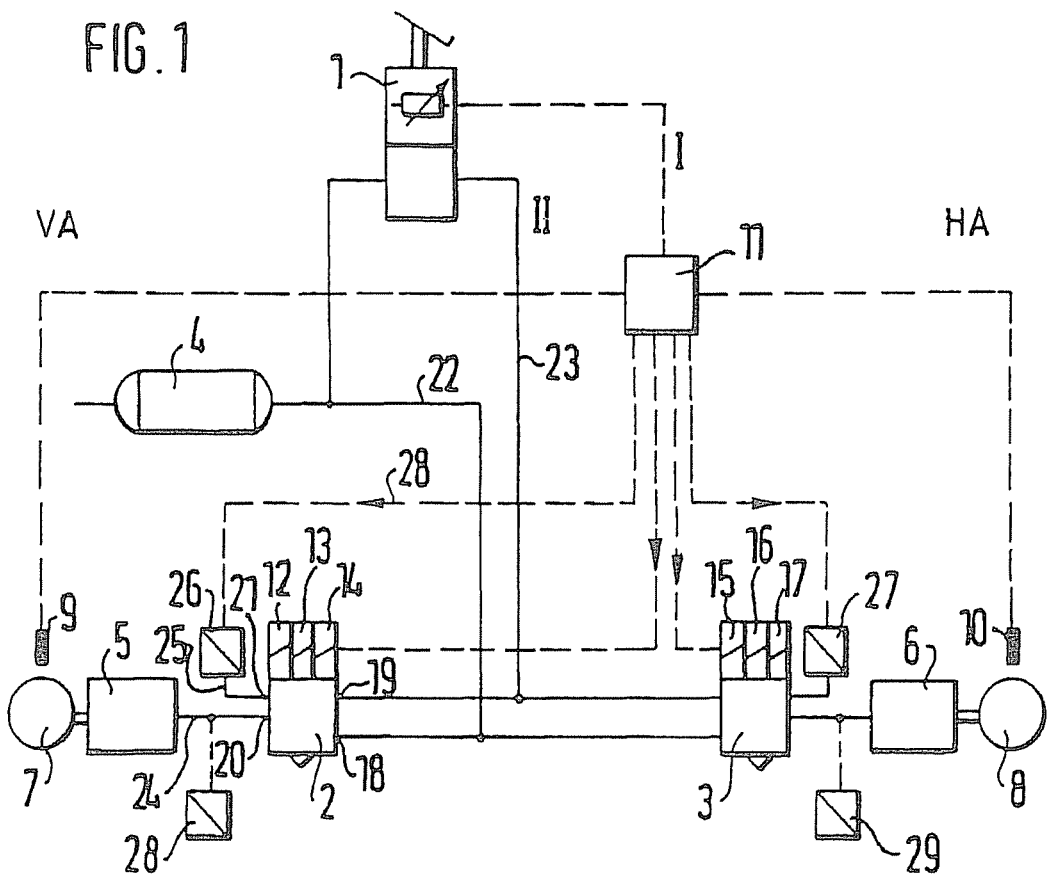

| 7,474,951 B1 | 1/2009 | Lenz et al. | |
|---|---|---|---|
| 2007/0040446 A1* | 2/2007 | Hamm | 303/137 |
| 2007/0329131 | 2/2007 | Ghoeim et al. | |

FOREIGN PATENT DOCUMENTS

| DE | 196 01 529 | 7/1997 |
|---|---|---|
| DE | 102 53 536 | 5/2004 |
| DE | 10 2006 035604 | 3/2007 |
| DE | 10 2006 045317 | 5/2007 |
| DE | 195 44 445 | 9/2007 |
| DE | 10 2006 024617 | 11/2007 |
| DE | 10 2010 007409 | 1/2012 |
| EP | 0 475 010 | 3/1992 |
| EP | 0 478 953 | 3/1994 |
| EP | 1 070 623 | 1/2001 |
| EP | 1 419 946 | 5/2004 |

OTHER PUBLICATIONS

European Patent Office, International Preliminary Report on Patentability, Aug. 14, 2012, from International Patent Application No. PCT/EP2011/051878, filed on Feb. 9, 2011.

European Patent Office, English Translation of International Preliminary Report on Patentability and Written Opinion, Aug. 14, 2012, from International Patent Application No. PCT/EP2011/051878, filed on Feb. 9, 2011.

* cited by examiner

METHOD FOR OPERATING A BRAKE-SLIP REGULATING ARRANGEMENT OF A BRAKE SYSTEM OF A VEHICLE

FIELD OF THE INVENTION

The present invention relates to a method for operating a brake-slip regulating arrangement of a brake system of a vehicle in various operating modes, such as an on-road operating mode and an off-road operating mode, in accordance with driving conditions, wherein, in the on-road operating mode, the brake-slip regulating arrangement is put into operation on at least one rear axle and one front axle.

BACKGROUND INFORMATION

A method of this kind is discussed in DE 10 2006 035 604 A1, in which a driving mode in which the relevant vehicle subsystems are set in a particular way, with a desired slip value of a drive slip system (ASR) being increased, the steering system being adapted for steering at low speeds and a suspension system being adapted for example, is referred to as an off-road operating mode. Moreover, the minimum driving speed at which an antilock system (ABS) is activated is increased, i.e. the ABS comes into action at a higher threshold speed than that for an on-road operating mode, but then does so on all the axles or wheels.

Also understood are vehicles with brake systems in which the ABS is completely deactivated on all the wheels or axles in the off-road operating mode, and vehicles with brake systems that are completely without ABS. However, there are legal provisions, e.g. ECE R13 Annex 10, diagrams 1B, 1C) according to which certain adhesion coefficients for laden and unladen vehicles have to be maintained. As a result, the braking force has to be distributed in a load-dependent manner on such vehicles in order to distribute the braking force to the front and rear axles in a load-dependent manner and to avoid the wheels of the rear axle locking up earlier than the wheels of the front axle, which would have a negative effect on driving stability.

Thus, for example, DE 10 2006 045 317 A1, discusses so-called EBD regulating arrangements (Electronic Brakeforce Distribution), in which the rear axle brakes are isolated from a further pressure buildup during a braking operation due to the slip on at least one rear wheel. However, such regulation requires a load detection arrangement, such as an LSV (load sensing valve) to detect the load distribution, and this entails a certain expense.

SUMMARY OF THE INVENTION

It is accordingly the underlying object of the exemplary embodiments and/or exemplary methods of the present invention to develop a method of the type mentioned at the outset in such a way that driving stability in the off-road operating mode is as high as possible and that this method can be implemented with an arrangement that is as simple as possible.

According to the exemplary embodiments and/or exemplary methods of the present invention, this object is achieved by the features described herein.

The exemplary embodiments and/or exemplary methods of the present invention are intended to provide that, even in the off-road operating mode, the brake-slip regulating arrangement continues to operate on at least one rear axle of the vehicle until the brake slip on at least one wheel of a front axle is less than or equal to a specified brake-slip limit, and that, if the specified brake-slip limit is exceeded by the brake slip on the at least one wheel of the front axle, the brake-slip regulating arrangement is put out of operation on the at least one rear axle and is not put into operation again until the brake slip on the at least one wheel of the front axle is again less than or equal to the specified brake-slip limit.

A brake-slip value which corresponds substantially to locking up of the wheel may be set as the brake-slip limit specified on the at least one wheel of the front axle.

In other words, the ABS remains activated on the wheels of the at least one rear axle until at least one wheel of the front axle has a tendency to lock up or enters a state close to locking up or similar thereto, in which the brake slip of the front wheel concerned is impermissibly high. Only when at least one of the wheels of the front axle locks up is the ABS deactivated or put out of operation on the rear axle, and it is reactivated only when there is no longer a lock-up state on the wheel or wheels of the front axle when braking.

This is a reliable way of avoiding unstable driving states, in which the wheels of the rear axle lock up earlier than the wheels of the front axle. Moreover, no additional sensors or components are required to implement the method according to the present invention because the wheel speed sensors, which are present on the wheels of the front axle in any case in the context of ABS, together with the vehicle reference speed determined, provide information as to whether the wheels of the front axle are locking up. Overall, the entire method can be implemented within the existing ABS control unit.

Advantageous developments and improvements of the present invention indicated herein are possible by the measures presented in the further descriptions herein.

In a particular embodiment, the brake-slip regulating arrangement is put out of operation on the at least one wheel of the front axle in the off-road operating mode, with the exception that the signals of a wheel speed sensor of the at least one wheel of the front axle are used to determine whether the brake slip on the at least one wheel of the front axle is less than, equal to or greater than the specified brake-slip limit.

According to one alternative, the brake-slip regulating arrangement continues to operate on the at least one wheel of the front axle, even in the off-road operating mode, and, in the context of the brake-slip regulating arrangement continuing to operate on the at least one wheel of the front axle, the signals of the wheel speed sensor of the at least one wheel of the front axle are used to determine whether the brake slip on the at least one wheel of the front axle is less than, equal to or greater than the specified brake-slip limit.

In this case, the off-road operating mode of the brake-slip regulating arrangement is activated automatically, i.e. without intervention by the driver, by a monitoring device, which monitors the driving conditions of the vehicle by a sensor system, e.g. if the sensor system detects from the speed of travel, deflection of the vehicle suspension or acceleration signals in the vertical direction that the vehicle is being driven off-road rather than on a level road. As an alternative, it is, of course, also possible for the off-road operating mode to be activated by an operator or the driver of the vehicle by a suitable input device.

When in operation or when left in operation in the context of the off-road operating mode, the brake-slip regulating arrangement can, in particular, be set to a higher desired brake-slip value on the at least one rear axle of the vehicle than that for the on-road operating mode, and the actual brake-slip value is then adjusted to said desired value. By this measure, it is possible to allow higher brake-slip values on the rear axle, these being more suitable for off-road journeys.

The exemplary embodiments and/or exemplary methods of the present invention also relate to a device having at least one brake-slip regulation control device, which is designed to carry out the method as claimed in one of the preceding claims. In particular, this device contains an actuating arrangement for setting the operating modes of the brake-slip regulating arrangement (ABS), such as an on-road operating mode or an off-road operating mode.

The exemplary embodiments and/or exemplary methods of the present invention furthermore also relate to a computer program product having program segments for carrying out the method according to the present invention, which is stored on a computer-readable recording medium or in a computer-readable recording device.

Further measures to improve the exemplary embodiments and/or exemplary methods of the present invention are explained in greater detail below with reference to the drawing, together with the description of an exemplary embodiment of the present invention.

BRIEF DESCRIPTIONS OF THE DRAWING

FIG. 1 shows a schematic representation of a brake system with ABS in accordance with an embodiment of the present invention.

DETAILED DESCRIPTION

The electropneumatic brake system of an all-wheel-drive vehicle, said system being shown in the figure, has an electropneumatic brake signal transmitter 1, by which an electric control circuit I and a pneumatic control circuit II can be supplied with brake signals. The pneumatic control circuit II leads directly to two pressure control valve arrangements 2 and 3, which are connected, on the one hand, to a compressed air reservoir 4 and, on the other hand, to respective wheel brake cylinders 5 and 6. The two brake cylinders 5 and 6 actuate the wheel brakes of wheels 7, 8 of different axles, e.g. a front axle VA and a rear axle HA. For the sake of simplicity, the front axle VA and the rear axle each have just one common control circuit I and II, respectively.

Both wheels 7 and 8 are fitted with ABS rotational speed detectors 9 and 10, which output their signals to an electronic brake control unit 11, in which the ABS functions are also implemented. The brake control unit 11 is connected to the control circuit I and to two sets of three solenoid valves 12, 13, 14 and 15, 16, 17, which are integrated into each pressure control valve arrangement 2 and 3 respectively.

Figure 2:
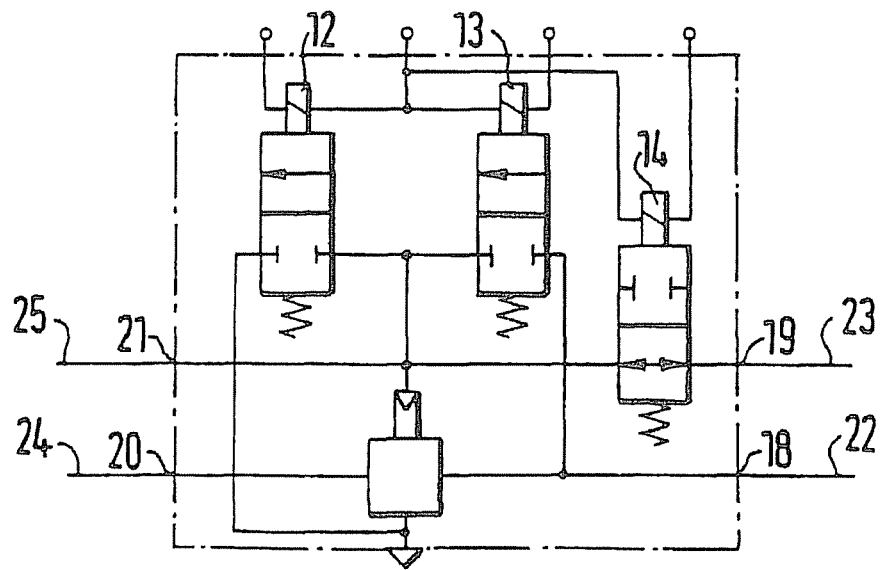

As is apparent from FIG. 2, each pressure control valve arrangement 2 and 3 has four pneumatic ports 18, 19, 20 and 21, port 18 serving for connection to a supply line 22 brought in from the reservoir 4. The brake signal transmitter 1 is connected to port 19 by a compressed air control line 23. Port 20 leads via a brake line 24 to brake cylinder 5, and port 21 is connected by a line 25 to a pressure sensor 26 (pressure sensor 27 on the right), which is also connected, by an electric line 28, to the electronic brake control unit 11.

As can be seen from the routing of the lines in the pressure control valve arrangement 2, the two solenoid valves 12, 13 and 15, 16 are used for ABS control and for electrical adjustment of a pressure specified by the brake signal transmitter 1, while solenoid valves 13 and 16, respectively, are used—when energized—to control the rise in pressure and solenoid valves 12 and 15, respectively, are used—when energized—for pressure relief.

In contrast, solenoid valves 14 and 17, respectively, are open when deenergized and in this way ensure that the pressure control valve arrangement 2 can be operated while deenergized via the compressed air control line 23. Solenoid valves 14 and 17, respectively, are so-called retention or back-up valves, which are switched to the closed position at the start of braking if the electrical system is intact. When the brake signal transmitter 1 is actuated, the solenoid retention valves 14 and 17, respectively, are first of all switched to the energized closed position thereof. The compressed air control line 23 is thus isolated from the pressure control valve arrangements 2 and 3, respectively. Solenoid valves 13 and 16, respectively, are switched over in order to allow compressed air to pass from the reservoir 4 via line 22 to the pressure control valve arrangements 2 and 3, respectively, and to switch them over for braking. For braking, stored air is then sent into line 24 leading to the brake cylinders 5 and 6, respectively, by the relay valves 2 and 3, respectively. The actual pressure achieved during this process is measured by the pressure sensors 26 and 27, respectively, and transmitted to the electric brake control unit 11. If the brake control unit 11 detects an excessive actual pressure, a pressure reduction is controlled by solenoid valves 12 and 15, respectively.

During normal braking with an intact electrical system, solenoid valves 14 and 17, respectively, close as soon as the brake signal transmitter 1 is actuated. As a result, control circuit II becomes inoperative. If the electrical system fails, however, the solenoid valves 12, 13, 14 and 15, 16, 17 can no longer be energized. Pressure is now fed in via the pneumatic control circuit II, therefore, since the two back-up solenoid valves 14 and 17 are open when unenergized.

The ABS control routines implemented in the brake control unit 11 control the pressure control valve arrangements 2 and 3 to increase the pressure, maintain the pressure or lower the pressure in the brake cylinders 5, 6 in order to set an optimum brake slip at the wheels 7, 8. An ABS system of this kind is fundamentally known, e.g. from DE 40 30 980 A1.

Moreover, the ABS brake-slip regulating arrangement of the brake system is operated in various operating modes, such as an on-road operating mode and an off-road operating mode, in accordance with driving conditions, wherein the brake-slip regulating arrangement (ABS) is put into operation or activated for all the wheels of the rear axle HA and of the front axle VA or 7, 8 according to a basic setting in the on-road operating mode. In other words, the driving conditions currently prevailing determine the respective operating mode of the ABS.

In this case, the off-road operating mode of the brake-slip regulating arrangement can be activated automatically, i.e. without intervention by the driver, by a monitoring device in the brake control unit 11, which monitors the driving conditions of the vehicle by a sensor system, e.g. if the sensor system detects from the speed of travel, deflection of the vehicle suspension or acceleration signals in the vertical direction that the vehicle is being driven off-road rather than on a level road in the on-road operating mode. As an alternative, it is, of course, also possible for the off-road operating mode to be activated manually by an operator or the driver of the vehicle by a suitable input device, which communicates with the brake control unit 11.

It is proposed that, even in the off-road operating mode, the brake-slip regulating arrangement continues to operate on the rear axle HA of the vehicle until the brake slip on at least one wheel 7 of the front axle VA is less than or equal to a specified brake-slip limit, and that, if the specified brake-slip limit is exceeded by the brake slip on the at least one wheel 7 of the front axle VA, the brake-slip regulating arrangement is put out of operation on the at least one rear axle HA and is not put into operation again until the brake slip on the at least one wheel 7 of the front axle VA is again less than or equal to the specified brake-slip limit.

A brake-slip value which corresponds substantially to locking up of the wheel 7 may be set as the brake-slip limit specified on the at least one wheel 7 of the front axle VA.

In the off-road operating mode, the brake-slip regulating arrangement may particularly be put out of operation on the at least one wheel 7 of the front axle VA, with the exception that the signals of the wheel speed sensor 9 of the at least one wheel 7 of the front axle VA are used to determine whether the brake slip on the at least one wheel 7 of the front axle VA is less than, equal to or greater than the specified brake-slip limit.

According to one alternative, the brake-slip regulating arrangement (ABS) continues to operate on the at least one wheel 7 of the front axle VA, even in the off-road operating mode, wherein, in the context of the brake-slip regulating arrangement continuing to operate on the at least one wheel 7 of the front axle VA, the signals of the wheel speed sensor 9 of the at least one wheel 7 of the front axle VA are used to determine whether the brake slip on the at least one wheel 7 of the front axle VA is less than, equal to or greater than the specified brake-slip limit.

When in operation or when left in operation in the context of the off-road operating mode, the brake-slip regulating arrangement is, in particular, set to a higher desired brake-slip value on the at least one rear axle HA of the vehicle than that for the on-road operating mode, and the actual brake-slip value is then adjusted to said desired value. By virtue of this measure, higher brake-slip values are permitted on the rear axle HA, these being more suitable for off-road journeys.

In particular, the ABS regulating arrangement described above, which is dependent on the operating mode (off-road operating mode, on-road operating mode), is implemented in the brake control unit 11 and controls the brake system accordingly.

LIST OF REFERENCE SIGNS

1 brake signal transmitter
2 pressure control valve arrangement
3 pressure control valve arrangement
4 reservoir
5 brake cylinder
6 brake cylinder
7 wheel
8 wheel
9 rotational speed detector
10 rotational speed detector
11 brake control unit
12 solenoid valve
13 solenoid valve
14 solenoid valve
15 solenoid valve
16 solenoid valve
17 solenoid valve
18 port
19 port
20 port
21 port
22 supply line
23 control line
24 brake line
25 line
26 pressure sensor
27 pressure sensor
28 line

The invention claimed is:

1. A method for operating a brake-slip regulating arrangement (ABS) of a brake system of a vehicle in various operating modes, including an on-road operating mode and an off-road operating mode, in accordance with driving conditions, the method comprising:
   activating, in the on-road operating mode, the brake-slip regulating arrangement on at least one rear axle and one front axle, wherein even in the off-road operating mode, the brake-slip regulating arrangement continues to operate on at least one rear axle of the vehicle until the brake slip on at least one wheel of a front axle is less than or equal to a specified brake-slip limit; and
   if the specified brake-slip limit is exceeded by the brake slip on the at least one wheel of the front axle, putting the brake-slip regulating arrangement out of operation on the at least one rear axle and is not put into operation again until the brake slip on the at least one wheel of the front axle is again less than or equal to the specified brake-slip limit.

2. The method of claim 1, wherein the brake-slip regulating arrangement is put out of operation on the at least one wheel of the front axle in the off-road operating mode, with the exception that the signals of a wheel speed sensor of the at least one wheel of the front axle are used to determine whether the brake slip on the at least one wheel of the front axle is less than, equal to or greater than the specified brake-slip limit.

3. The method of claim 1, wherein the brake-slip regulating arrangement continues to operate on the at least one wheel of the front axle, even in the off-road operating mode, and that, in the context of the brake-slip regulating arrangement continuing to operate on the at least one wheel of the front axle, the signals of the wheel speed sensor of the at least one wheel of the front axle are used to determine whether the brake slip on the at least one wheel of the front axle is less than, equal to or greater than the specified brake-slip limit.

4. The method of claim 1, wherein the off-road operating mode of the brake-slip regulating arrangement is activated by a monitoring device, which monitors the driving conditions of the vehicle by arrangement of a sensor system, or by a person operating the vehicle.

5. The method of claim 1, wherein when in operation or when left in operation in the context of the off-road operating mode, the brake-slip regulating arrangement sets a higher desired brake-slip value on the at least one rear axle of the vehicle than that for the on-road operating mode, and an actual brake-slip value is adjusted to the desired value.

6. The method of claim 1, wherein a brake-slip value which corresponds substantially to locking up of the wheel is set as the brake-slip limit specified on the at least one wheel of the front axle.

7. A device, comprising:
   at least one brake-slip regulation control device for operating a brake-slip regulating arrangement (ABS) of a brake system of a vehicle in various operating modes, including an on-road operating mode and an off-road operating mode, in accordance with driving conditions, by performing the following:
      activating, in the on-road operating mode, the brake-slip regulating arrangement on at least one rear axle and one front axle, wherein even in the off-road operating mode, the brake-slip regulating arrangement continues to operate on at least one rear axle of the vehicle until the brake slip on at least one wheel of a front axle is less than or equal to a specified brake-slip limit; and if the specified brake-slip limit is exceeded by the brake slip on the at least one wheel of the front axle, putting the brake-slip regulating arrangement out of operation on the at least one rear axle and is not put into operation again until the brake slip on the at least one wheel of the front axle is again less than or equal to the specified brake-slip limit.

8. The device of claim 7, further comprising:

an actuating arrangement for setting the operating modes of the brake-slip regulating arrangement (ABS), including at least one of the on-road operating mode the off-road operating mode.

9. A non-transitory computer readable medium having a computer program, which is executable by a processor, comprising:

a program code arrangement having program code for operating a brake-slip regulating arrangement (ABS) of a brake system of a vehicle in various operating modes, including an on-road operating mode and an off-road operating mode, in accordance with driving conditions, by performing the following:

activating, in the on-road operating mode, the brake-slip regulating arrangement on at least one rear axle and one front axle, wherein even in the off-road operating mode, the brake-slip regulating arrangement continues to operate on at least one rear axle of the vehicle until the brake slip on at least one wheel of a front axle is less than or equal to a specified brake-slip limit; and if the specified brake-slip limit is exceeded by the brake slip on the at least one wheel of the front axle, putting the brake-slip regulating arrangement out of operation on the at least one rear axle and is not put into operation again until the brake slip on the at least one wheel of the front axle is again less than or equal to the specified brake-slip limit.

10. A non-transitory computer-readable recording device having a computer program, which is executable by a processor, comprising:

a program code arrangement having program code for operating a brake-slip regulating arrangement (ABS) of a brake system of a vehicle in various operating modes, including an on-road operating mode and an off-road operating mode, in accordance with driving conditions, by performing the following:

activating, in the on-road operating mode, the brake-slip regulating arrangement on at least one rear axle and one front axle, wherein even in the off-road operating mode, the brake-slip regulating arrangement continues to operate on at least one rear axle of the vehicle until the brake slip on at least one wheel of a front axle is less than or equal to a specified brake-slip limit; and if the specified brake-slip limit is exceeded by the brake slip on the at least one wheel of the front axle, putting the brake-slip regulating arrangement out of operation on the at least one rear axle and is not put into operation again until the brake slip on the at least one wheel of the front axle is again less than or equal to the specified brake-slip limit;

wherein a brake-slip value which corresponds substantially to locking up of the wheel is set as the brake-slip limit specified on the at least one wheel of the front axle.

11. The recording device of claim 10, wherein the brake-slip regulating arrangement is put out of operation on the at least one wheel of the front axle in the off-road operating mode, with the exception that the signals of a wheel speed sensor of the at least one wheel of the front axle are used to determine whether the brake slip on the at least one wheel of the front axle is less than, equal to or greater than the specified brake-slip limit.

12. The recording device of claim 10, wherein the brake-slip regulating arrangement continues to operate on the at least one wheel of the front axle, even in the off-road operating mode, and that, in the context of the brake-slip regulating arrangement continuing to operate on the at least one wheel of the front axle, the signals of the wheel speed sensor of the at least one wheel of the front axle are used to determine whether the brake slip on the at least one wheel of the front axle is less than, equal to or greater than the specified brake-slip limit.

13. The recording device of claim 10, wherein the off-road operating mode of the brake-slip regulating arrangement is activated by a monitoring device, which monitors the driving conditions of the vehicle by arrangement of a sensor system, or by a person operating the vehicle.

14. The recording device of claim 10, wherein when in operation or when left in operation in the context of the off-road operating mode, the brake-slip regulating arrangement sets a higher desired brake-slip value on the at least one rear axle of the vehicle than that for the on-road operating mode, and an actual brake-slip value is adjusted to the desired value.

15. The device of claim 7, wherein the brake-slip regulating arrangement is put out of operation on the at least one wheel of the front axle in the off-road operating mode, with the exception that the signals of a wheel speed sensor of the at least one wheel of the front axle are used to determine whether the brake slip on the at least one wheel of the front axle is less than, equal to or greater than the specified brake-slip limit.

16. The device of claim 7, wherein the brake-slip regulating arrangement continues to operate on the at least one wheel of the front axle, even in the off-road operating mode, and that, in the context of the brake-slip regulating arrangement continuing to operate on the at least one wheel of the front axle, the signals of the wheel speed sensor of the at least one wheel of the front axle are used to determine whether the brake slip on the at least one wheel of the front axle is less than, equal to or greater than the specified brake-slip limit.

17. The device of claim 7, wherein the off-road operating mode of the brake-slip regulating arrangement is activated by a monitoring device, which monitors the driving conditions of the vehicle by arrangement of a sensor system, or by a person operating the vehicle.

18. The device of claim 7, wherein when in operation or when left in operation in the context of the off-road operating mode, the brake-slip regulating arrangement sets a higher desired brake-slip value on the at least one rear axle of the vehicle than that for the on-road operating mode, and an actual brake-slip value is adjusted to the desired value.

19. The device of claim 7, wherein a brake-slip value which corresponds substantially to locking up of the wheel is set as the brake-slip limit specified on the at least one wheel of the front axle.

20. The computer readable medium of claim 9, wherein the brake-slip regulating arrangement is put out of operation on the at least one wheel of the front axle in the off-road operating mode, with the exception that the signals of a wheel speed sensor of the at least one wheel of the front axle are used to determine whether the brake slip on the at least one wheel of the front axle is less than, equal to or greater than the specified brake-slip limit.

21. The computer readable medium of claim 9, wherein the brake-slip regulating arrangement continues to operate on the at least one wheel of the front axle, even in the off-road operating mode, and that, in the context of the brake-slip regulating arrangement continuing to operate on the at least one wheel of the front axle, the signals of the wheel speed sensor of the at least one wheel of the front axle are used to determine whether the brake slip on the at least one wheel of the front axle is less than, equal to or greater than the specified brake-slip limit.

22. The computer readable medium of claim 9, wherein the off-road operating mode of the brake-slip regulating arrangement is activated by a monitoring device, which monitors the driving conditions of the vehicle by arrangement of a sensor system, or by a person operating the vehicle.

23. The computer readable medium of claim 9, wherein when in operation or when left in operation in the context of the off-road operating mode, the brake-slip regulating arrangement sets a higher desired brake-slip value on the at least one rear axle of the vehicle than that for the on-road operating mode, and an actual brake-slip value is adjusted to the desired value.

\* \* \* \* \*